UNITED STATES PATENT OFFICE.

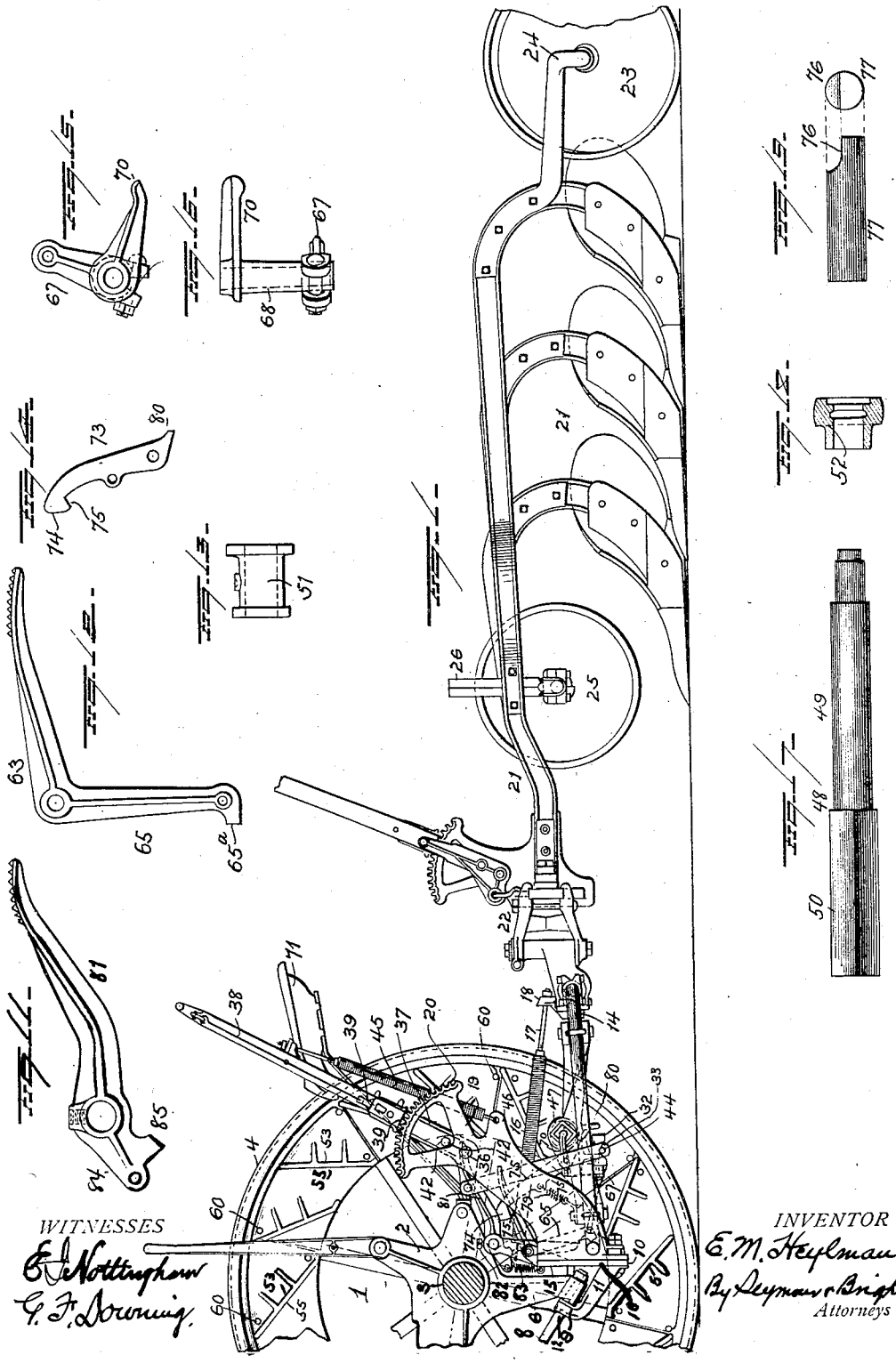

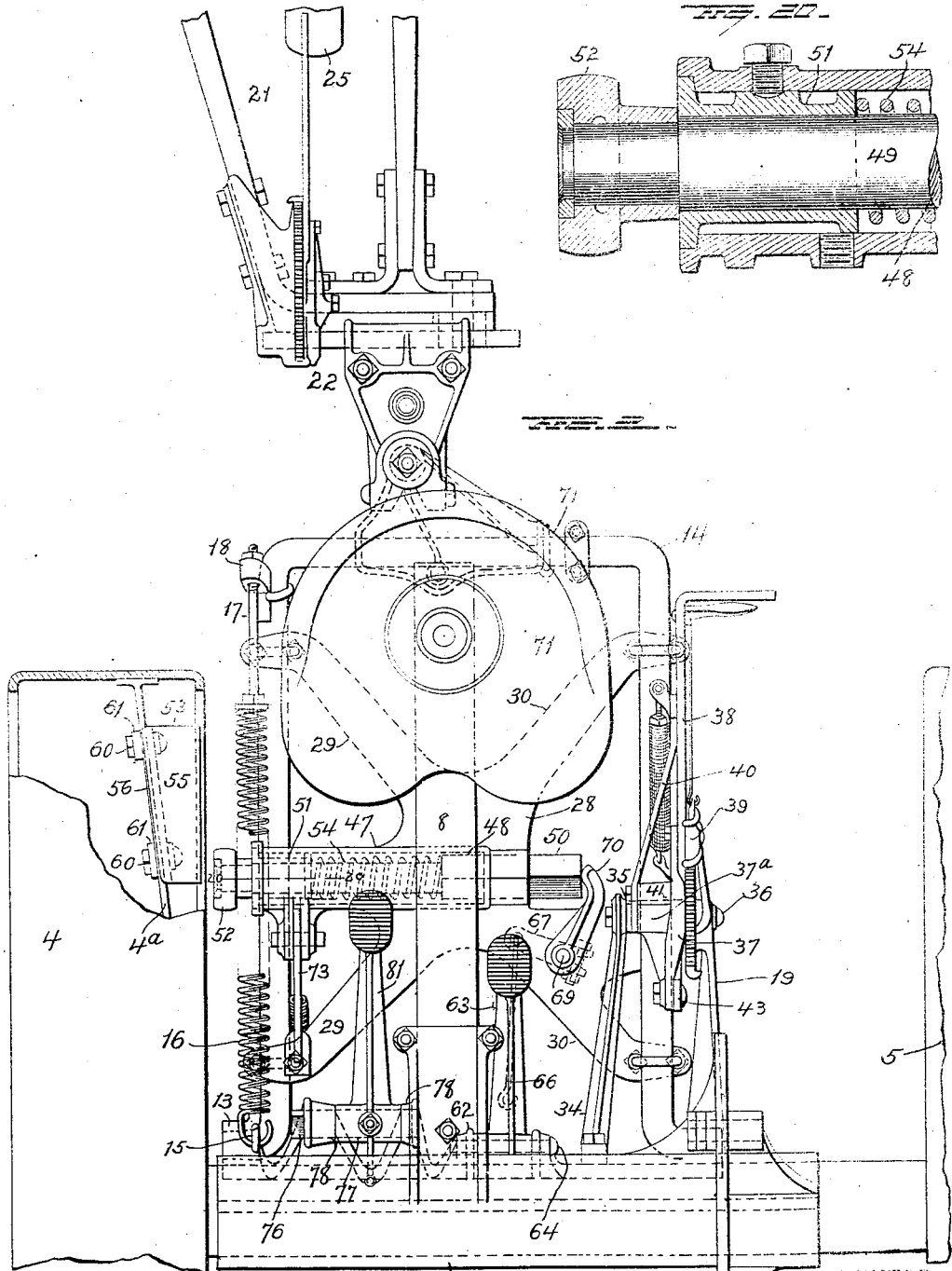

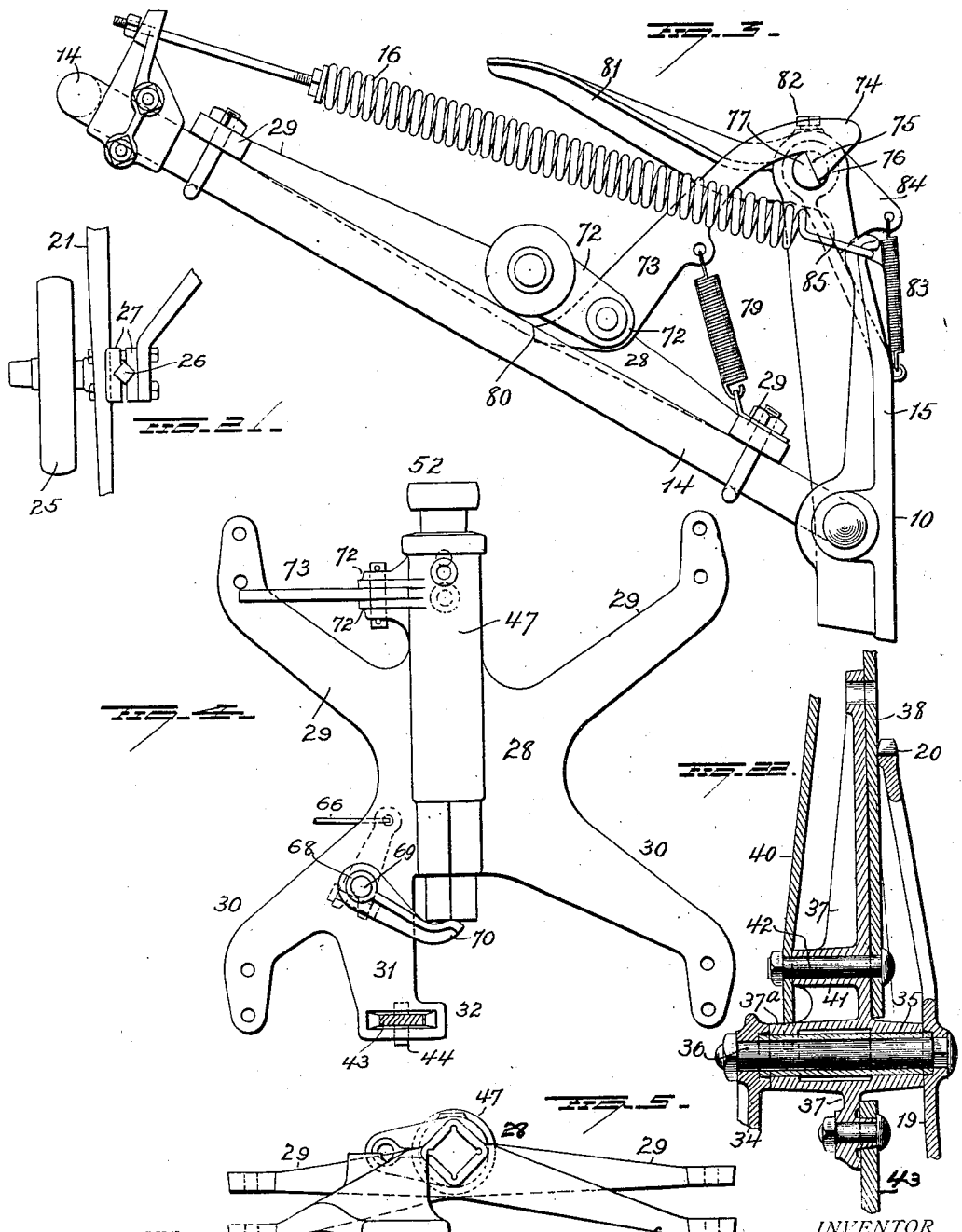

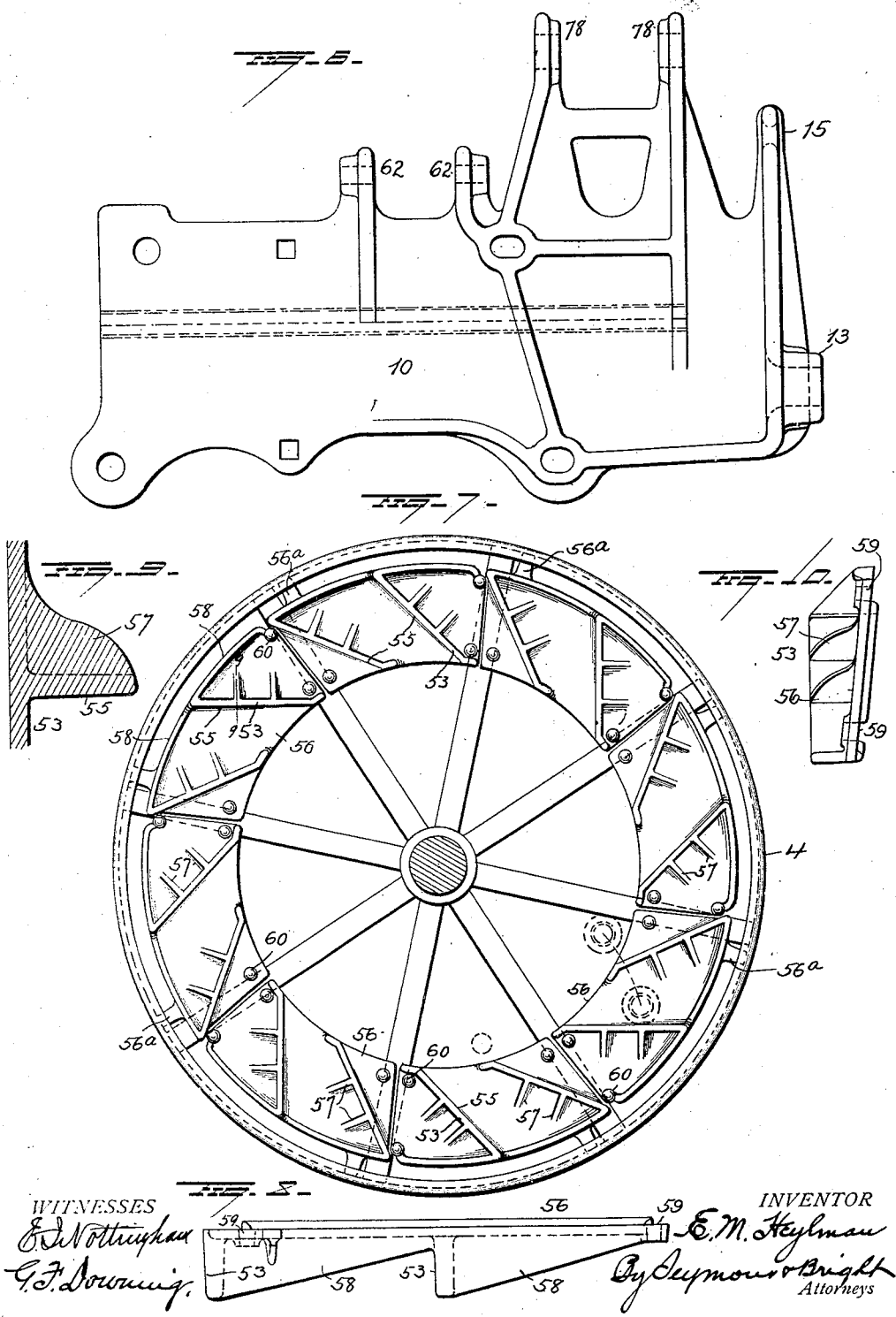

EDWARD M. HEYLMAN, OF SOUTH BEND, INDIANA, ASSIGNOR TO OLIVER CHILLED PLOW WORKS, OF SOUTH BEND, INDIANA.

ENGINE GANG-PLOW.

1,284,675.  Specification of Letters Patent.  Patented Nov. 12, 1918.

Application filed July 7, 1916. Serial No. 108,023.

*To all whom it may concern:*

Be it known that I, EDWARD M. HEYLMAN, a citizen of the United States, and a resident of South Bend, in the county of St. Joseph and State of Indiana, have invented certain new and useful Improvements in Engine Gang-Plows; and I do hereby declare the following to be a full, clear, and exact description of the invention, such as will enable others skilled in the art to which it appertains to make and use the same.

This invention relates to improvements in plows and more particularly to that type known in the art as "engine gang plows" such as disclosed in my prior Patent No. 1,148,088 and application for patent filed by me on the 18th day of November, 1915, and designated by Serial No. 62,177.

One object of my present invention is to provide simple and efficient power lift mechanism for engine plows of the type above identified.

A further object is to provide power lift mechanism which shall be operable from one of the wheels of the tractor and which may be readily controlled by an operator riding on the tractor.

A further object is to so construct power lift mechanism for an engine gang plow, that the operator may readily control the same by means of foot levers and avoid the use of ropes connected with trip mechanism.

A further object is to so construct and arrange power lift mechanism for engine gang plows of the type previously specified, that the bail or draft device may be raised by one of the wheels of the tractor to raise the plow gang.

A further object is to so construct an engine gang plow in which the plow gang is connected with the tractor through the medium of a bail or pivoted draft device, that a movable member mounted on the bail or draft device may be moved by the operator into the path of devices secured to one of the tractor wheels to effect the raising of the draft device or bail and the plow gang.

A further object is to provide, in an engine gang plow structure embodying a tractor and a plow gang connected therewith, pedal controlled mechanism coöperable with one of the wheels of the tractor for effecting the raising of the plow gang, means for latching the gang in raised position, and pedal controlled releasing means for lowering the plow gang.

A further object is to provide simple and efficient means for regulating the depth of plowing when the ground is uneven.

A further object is to so construct and arrange power lift mechanism for an engine gang which shall be operable by the tractor as long as the wheels can turn even though the tractor may be unable to move the plow forward.

With these and other objects in view, the invention consists in certain novel features of construction and combinations of parts as hereinafter set forth and pointed out in the claims.

In the accompanying drawings; Figure 1 is a side elevation, partly in section, of an engine gang plow embodying my improvements; Fig. 2 is a plan view of the same; Fig. 3 is a detail view showing the trip devices for effecting the lowering of the plow; Fig. 4 is a plan view of the tail brace and associated parts; Fig. 5 is a side view of the structure shown in Fig. 4; Fig. 6 is a face view of the plate 10; Fig. 7 is a view showing the tractor wheel 4 and the raising lugs; Figs. 8, 9 and 10 are detail views showing raising lugs and one of the plates 56, the section Fig. 9 being taken on the line 9—9 Fig. 7; Fig. 11 is a detail view of the foot lever 81; Fig. 12 is a detail view showing the foot lever 63; Fig. 13 is a detail view of the bushing 51; Fig. 14 is a detail view of the latch bar 73; Figs. 15 and 16 are detail views showing the arms 67—70 and the means connecting them; Fig. 17 is a detail view of the plunger 48; Fig. 18 is a sectional view of the roller 52; Fig. 19 is a view of the short shaft 77; Fig. 20 is an enlarged sectional view on the line 20—20 of Fig. 2; Fig. 21 is a plan view showing the connection of the gage wheel with the plow gang, and Fig. 22 is an enlarged sectional view through the mounting of the bell-crank 37.

1 represents a traction engine or tractor comprising, as a part of the structure, a bearing bracket 2 for the accommodation of the rear axle 3 to which latter the traction wheels 4—5 are secured, and motion may be imparted to said axle from the motor (not shown) by means of any suitable gearing.

The bracket 2 is made with a depending portion 6 provided at the lower edge with sleeves such as indicated at 7 for the reception of stay bolts 8 connecting said depending portion of the bracket with the tractor structure,—the construction of said stay bolts being made secure by means of nuts 9. In the drawings, I have illustrated one of the stay bolts 8 and its connection with the depending portion of the bearing bracket, but it is apparent that at least two such stay bolts will be employed.

A ribbed plate 10 is disposed in proximity to the depending portion of the bearing bracket and bolted thereto. This plate depends appreciably below the depending portion 6 of the bracket 2 and is braced by means of arms 11 bolted to the lower edge of said plate and formed at their rear ends with bifurcated, hook-shaped portions 12 to embrace the stay bolts 8 and engage the forward nuts 9 thereon.

The ribbed plate 10 is provided at one end with a journal bearing 13 to receive one of the journals of a bail or draft device 14, and at this same end of the plate 10, an upwardly projecting arm 15 is provided for one end of an adjustable balancing spring 16,—the rear portion of said spring being connected, by means of an adjustable rod 17 with a bracket 18 secured to the rear portion of the bail or draft device. Near the other end of the plate 10, the lower end of an arm or bracket 19 is secured, said arm or bracket projecting upwardly and rearwardly from the plate and provided at its upper end with a toothed segment 20. The arm or bracket 19 is provided near its base with a bearing for the other journal of the bail or draft device 14. It will thus be seen that the bail or draft device 14 is pivotally connected at its forward end with the plate 10 and bracket 19 and hence with the bracket 2 of the tractor, substantially as shown and described in my former patent. As disclosed in my said former patent, a plow gang 21 is pivotally connected, through the medium of coupling and adjusting devices 22, with the rear cross bar of the draft bail 14, and at the rear end of the plow gang, a wheel 23 is located and mounted on a bracket 24 secured to the rearmost beam of said plow gang,—said wheel constituting a rear support and a rolling fulcrum for the plow gang and facilitates the raising and lowering of the latter by means of mechanism hereinafter explained.

A gage wheel 25 is provided near the forward portion of the plow gang to regulate the depth of plowing, especially when the ground being plowed is uneven. A vertical shaft 26 preferably angular in cross section, is adjustably clamped by means of blocks 27 to the plow gang at the forward end of the left hand beam and provided at its lower end with a lateral journal portion for the accommodation of the gage wheel.

The pivoted bail or draft device is strengthened by a brace 28 having diagonal arms 29—30 rigidly secured to the side members of the bail,—said brace serving to resist torsional strain to which the bail may be subjected. In order to secure the best results, I prefer to so form the brace that two of the arms 29, 29, will be disposed at their outer ends upon one side member of the bail, and so that the outer ends of the other arms 30, 30 will be disposed under the other side member of the bail. An arm 31 projects laterally from one of the arms 30 of the brace and extends outwardly under the adjacent side member of the draft bail 14, the free end of said arm 31 being provided with a loop 32, the lower edges of which are made with V-shaped notches 33, as shown in Figs. 4 and 5.

An arm or bracket 34 is secured to the plate 10 and between its free end and the segment bracket 19, a tubular bearing 35 is disposed,—said tubular bearing being secured between the brackets 10 and 34 by means of a bolt 36. A bell-crank 37 is mounted on the tubular bearing 35 and constitutes the pivot-member of a lever 38 which is secured thereto,—said lever carrying a manually operable detent 39 to engage the toothed segment 20. A brace 40 is secured at one end to the upper portion of the lever 38 and extends to the hub 37ª of the bell-crank 37, the lower end of the brace being secured to a perforated boss 41 on the bell-crank by means of a bolt 42. A rod or link 43 is pivotally attached at its upper end to the forwardly projecting arm of the bell-crank or lever pivot-member 37, and passes downwardly through the loop 32 on the arm 31 of the bail brace,—said rod or link being provided near its lower end with a transverse pin 44 to engage in the notches 33 of said loop. It will be readily understood that by manipulating the lever 38, the bail 14 may be raised or lowered on its pivotal connection with the tractor and that the plow gang will be correspondingly raised or lowered. Thus the plow gang may be raised or lowered manually to adjust the plow gang for depth of plowing. When the gage wheel 25 is employed, the lever 38 should be set as far forwardly as the segment 20 will permit, thus causing the pin 44 to be sufficiently far down below the notched loop 32 to enable the gage wheel to always rest on the ground when going over uneven places in the field. When the plow gang is raised or lowered by hand with the use of the lever 38, such raising or lowering of the gang will be assisted by the action of a balancing spring 45, one end of which latter is adjustably connected with the lever 38 and the other end of said spring is connected with an arm 46 on the segment bracket.

An important feature of my present invention resides in power lift mechanism actuated by one of the carrying wheels of the tractor and controllable by foot-actuated mechanism, and the construction and operation of these mechanisms will now be explained.

The bail brace 14 is provided with a horizontally disposed tube or sleeve 47 (which may be made integral with said brace) and projects therefrom (between the arms 29—29) in a direction toward the right hand wheel 4 of the tractor,—the free end of said tube or sleeve also projecting over one side member of the bail. The sleeve 47 constitutes a mounting for a longitudinally movable bar or plunger 48, a portion 49 of which latter is made cylindrical in shape and a portion 50 is made angular,—the bore of the tube or sleeve having an angular portion to accommodate the angular portion of said bar or plunger. The angular portion of the bar or plunger projects rearwardly from the rear or left hand end of the tube or sleeve, while the cylindrical portion of said bar or plunger projects through a bushing 51 secured in the forward right hand end of the tube or sleeve and beyond the same. A roller 52 is mounted on the forwardly projecting end of the bar or plunger 48 and when the latter is moved longitudinally toward the right hand wheel 4 of the tractor, (as hereinafter explained) the wheel 52 will be moved into the path of lugs 53 carried by the tractor wheel 4. Normally, the plunger 48 will be forced in a direction toward the left hand tractor wheel 5 so as to dispose the roller 52 out of the path of the lugs on the tractor wheel 4, by the action of a spring 54 disposed within the tube or sleeve 47 and bearing at its respective ends against the shoulder formed by the angular portion 50 of the plunger and against the bushing 51.

The wheel 4 of the tractor is provided on its inner side with an annular series of lugs 53 as shown in Fig. 1 and each lug is tangentially disposed so as to present an inclined face 55. To facilitate the application of the lugs or projections 53 to the wheel 4, I prefer to employ an annular series of plates 56, each of which is formed with two lugs or projections 53, as shown in Fig. 7, and these lugs are strengthened or stiffened by means of intermediate ribs 57 and the plates 56 are reinforced at their outer edges by means of ribs 58 extending laterally from the outer ends of the lugs. Each plate 56 is provided at its ends with holes 59 for the passage of bolts 60 which serve, in conjunction with straps or plates 61, to secure the plates 56 to the spokes 4ª of the wheel 4. The plates 56 may also be provided with lugs 56ª to engage the rim of the wheel.

The plate 10 is provided with upwardly projecting lugs 62, 62, between which a foot lever 63 is pivotally supported by means of a suitable pivot pin 64. An arm 65 depends from the pivoted end of the foot lever 63, and the lower end of said arm is connected by means of a rod 66, with an arm 67 secured to the lower end of a tubular shaft 68 mounted on a pin 69 on the bail brace 19. To the upper end of the vertical shaft 68, an arm 70 is located and adapted to engage the end of the angular portion of the longitudinally movable bar or plunger 48. From this construction, it will be seen that when the operator (from his position on the seat 71 on the tractor) depresses the foot lever 63, motion will be imparted, through the arm 65, rod 66, arm 67, shaft 68 and arm 70 to move the bar or plunger 48 in a direction toward the tractor wheel 4, and the roller 52 into the path of the lugs 53 on the latter. In order to limit the movements of these parts, the depending arm 65 of the foot lever is provided with a stop lug 65ª to engage the plate 10. One of the lugs 53 on the tractor wheel 4 will now engage the roller 52 on the bar or plunger 48 and as the latter is carried by the brace of the draft bail, the latter will be raised on its pivotal connection with the tractor and in consequence of the pivotal connection of the bail with the plow gang, the latter will be raised and its soil-engaging members lifted from the ground. As the tractor continues to move forward, or as the wheels 4—5 continue to turn in the event that conditions will prevent the forward travel of the tractor, the roller 52 will run along the inclined face of the lug 53 and finally run off of the same. Before the roller leaves the lug however, the bail and plow gang will be latched in their raised position, by means which will now be explained: The tube or sleeve 47 on the bail brace 19 is provided with lugs 72, between which the lower end of a latch bar 73 is pivoted, the upper end of said latch bar being formed with a hook 74 having a flat face 75 to engage a flat face 76 on the projecting end of a pin or short shaft 77 mounted in arms 78 on the plate 10. The latch bar 73 is caused to quickly engage over the angular or flattened portion of the pin or shaft 77, by the action of a spring 79 attached at one end to said latch bar and at the other end to the bail brace or a part rigid therewith. The latch bar is provided below its pivotal support with a stop lug 80 to prevent said latch bar from being pulled too far downwardly by the spring 79.

A foot lever 81 is secured, by means of a set screw 82, (or otherwise) to the short shaft or pin 77 and is maintained in its normal elevated position by means of a spring 83 which may be attached at one end to an arm 84 on said lever 81 and at the other end to the plate 10 or a part rigid therewith. Movement of the foot lever 81 may be limited by a stop lug 85 on the arm 84 of said foot lever, and thus the flattened portion of the short shaft 77 will be retained in proper position to receive the hooked end of the latch bar.

When the draft bail and plow gang shall have been latched in their raised positions, and the operator desires to lower the gang to working position, he will press upon the foot lever 81, thus causing the short shaft or pin 77 to be turned so as to move the flat face 76 of said shaft or pin away from the flat face 75 of the latch bar and thus release the latter so that the draft bail and plow gang may descend. As the plow gang is now drawn forward by the tractor the plow bases will enter the ground to a depth regulated by the adjustment of the gage wheel 25 or the hand lever 38 or both.

It will be observed by reference to Fig. 1 of the drawing that the pivotal connection of the draft bail with the tractor is quite a distance below the center of the rear axle. This will cause the plow bases to take to the ground quickly and cause a reasonable amount of downward pull on the gage wheel or depth regulating lever, and furthermore by placing the pivotal connection of the bail with the tractor, a considerable distance below the center of the axle, there will be a tendency to pull downwardly on front guiding wheels of the tractor. While the pivoting of the bail considerably below the center of the axle, might, of itself, have a tendency to prevent the draft bail and plow gang from being raised high enough to clear track, still such tendency is entirely obviated by making the lifting lugs 53 on the tractor wheel of sufficient length to insure the proper extent of lifting to be effected.

Whenever the tractor meets a condition of soil that the lugs on driving wheels of the tractor slip and won't draw the plows and the wheels begin to suck down, the plow can be raised as long as it is possible to turn the wheel of the tractor. This relieves the tractor of its load. This makes it possible to get out of bad places in the field without being compelled to raise the plow by hand, which is common with plows that take the power from one of the wheels on the plow because it is necessary to travel forward to raise the plow where the power is taken from one of the wheels on the plow.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. The combination with a tractor, a plow, and a bail pivotally connected with the tractor and having pivotal connection with the forward end of the beam of the plow, of lifting devices movable with a wheel of the tractor, a movable device carried by said bail, and means for moving said movable device into the path of said lifting means.

2. The combination with a tractor, a plow, and a pivoted draft device connecting the forward end of the beam of the plow with the tractor, of lugs on one of the tractor wheels, means carried by the pivoted draft device and adapted to be brought into coöperative relation to said lugs to raise the plow.

3. The combination with a tractor, a plow, and pivoted draft devices connecting the forward end of the plow with the tractor, of power lift devices arranged for coöperation with one of the wheels of the tractor and with said pivoted draft devices to raise the plow, and controlling means for said power lift devices, mounted on the tractor.

4. The combination with a tractor, a plow, and pivoted draft devices connecting the forward end of the plow with the tractor, of power lift mechanism arranged for coöperation with one of the wheels of the tractor and with said pivoted draft devices to raise the plow, and pedal-operated controlling mechanism for said power lift mechanism.

5. The combination with a tractor, a plow and a draft device connecting the plow with the tractor, of power lift mechanism for the plow, said power lift mechanism including a plurality of lugs placed inside of the tire of one of the wheels of the tractor, and means for controlling said power lift mechanism from the tractor.

6. The combination with a tractor, a plow, and a pivoted draft device connecting the forward end of the beam of the plow with the tractor, of power lift mechanism coöperative with said draft device and operative by a wheel of the tractor, means for controlling the power lift mechanism to lift the plow, means for latching the pivoted draft device in lifted position, and means for releasing said latching means.

7. The combination with a tractor, a plow and a pivoted draft device connecting the forward end of the beam of the plow with the tractor, of power lift mechanism coöperative with the pivoted draft device and operative by a wheel of the tractor, pedal-operated means for controlling the coöperation of the power lift mechanism on the pivoted draft device with a wheel of the tractor, a latch for holding the draft device and the plow elevated, and pedal-operated means for releasing said latch to permit the draft device and plow to descend to working position.

8. The combination with a tractor, a plow, and a pivoted draft device connecting the forward end of the beam of the plow with the tractor, of lifting means on a wheel of the tractor, and means carried by the pivoted draft device to coöperate with said lifting means on the tractor wheel to lift the plow.

9. The combination with a tractor, a plow, and a pivoted draft device connecting the forward end of the beam of the plow with the tractor, of lifting means on a wheel of the tractor, means carried by the pivoted draft device to coöperate with the lifting means on the tractor wheel, and means for controlling the coöperation of the means on the pivoted draft device with the lifting means on the tractor wheel.

10. The combination with a tractor, a plow, and a pivoted draft device connecting the forward end of the beam of the plow with the tractor, of lifting means on a wheel of the tractor, means carried by the pivoted draft device to coöperate with the lifting means on the tractor wheel, means for controlling the coöperation of said means on the draft device with the lifting means on the tractor wheel, a latch carried by the draft device for holding the plow elevated, and means for releasing said latch.

11. The combination with a tractor, a plow, and a draft device connecting the plow with the tractor, of lifting means on a wheel of the tractor, a movable device on the draft device to coöperate with the lifting means on the tractor wheel, controlling means on the draft device for said movable device, and a lever mounted on the tractor for operating said controlling means.

12. The combination with a tractor, a plow, and a draft device connecting the plow with the tractor, of lifting means on a wheel of the tractor, a movable device on the draft device to coöperate with the lifting means on the tractor wheel, controlling means on the draft device for said movable device, a lever on the tractor for operating said controlling means, a latch on the draft device, means on the tractor to receive said latch, and a lever on the tractor to operate said latch engaging means to release the latch.

13. The combination with a tractor, a draft bail pivotally connected therewith, and a plow pivotally connected with said draft bail, of lifting devices on a wheel of the tractor, a movable member carried by the draft bail, lever operated means for moving said movable member into coöperative relation with the lifting devices on the tractor wheel, and means for retaining said movable member normally out of coöperative relation to said lifting devices.

14. The combination with a tractor, a draft bail pivotally connected therewith, and a plow pivotally connected with said bail, of a bail brace secured to the parallel members of the bail, a movable bar mounted on said brace, devices on a wheel of the tractor to coöperate with said bar, lever operated means for moving said bar into coöperative relation to the devices on the tractor for effecting the raising of the bail and plow, and means for normally retaining said bar out of such coöperative relation to the devices on the tractor wheel.

15. The combination with a tractor, a plow, and a draft device connecting the plow with the tractor, of a tube carried by said draft device, a bar movable longitudinally in said tube a plurality of lugs carried by one of the wheels of the tractor, lever operated means for moving said bar into coöperative relation to said lugs, and a spring normally retaining said bar out of coöperative relation to said lugs.

16. The combination with a tractor, a plow, and a draft device connecting the plow with the tractor, of a tube carried by the draft device and having a portion of its bore made angular, a bar passing through said tube and having an angular part to slide in the angular portion of the bore of the tube, a roller carried by said bar, lugs fixed to one side of one of the tractor wheels, means for moving said bar in one direction to move said roller into coöperative relation with the lugs on the tractor wheel, and a spring normally retaining said bar in withdrawn position.

17. The combination with a tractor, a plow, and a draft device connecting the plow with the tractor, of inclined lugs secured to one side of a wheel of the tractor, a tube carried by the draft device, a longitudinally movable bar mounted in and passing through said tube, an arm engaging one end of said bar for moving the latter into coöperative relation to the lugs on the tractor wheel, a shaft to which said arm is secured, a foot lever mounted on the tractor, means between said foot lever and shaft for effecting the operation of the latter when the foot lever is depressed, and a spring normally pressing the longitudinally movable bar against said arm.

18. The combination with a tractor, a plow, and a draft bail pivotally connected with the tractor and the plow, of a brace secured to and connecting the members of the bail, a tube on said brace, inclined lugs secured to one side of a wheel of the tractor, a longitudinally movable bar passing through said tube and adapted to be moved into coöperative relation to the lugs on the tractor wheel, a vertical shaft mounted in said brace, an arm on the upper end of said shaft bearing against one end of said bar, an arm on the lower end of said shaft, a foot lever on the tractor and provided with a depending arm, a rod connecting said lever arm with the arm on the lower end of said shaft, and a spring pressing the longitudinally movable bar against the arm at the upper end of said shaft.

19. The combination with a tractor, a plow and a draft device connecting the plow with the tractor, of power lift mechanism coöperating with said draft device and a wheel of the tractor, a latch bar pivotally mounted on said draft device, engaging means on the tractor for said latch bar, a spring connected with said latch bar, a stop for limiting the pivotal movement of the latch bar, and a lever for operating said latch engaging device to release the latch therefrom.

20. The combination with a tractor, a plow, and a draft device connecting the plow with the tractor, of power lift mechanism coöperating with a wheel of the tractor and with said draft device, lever operated means for controlling said power lift mechanism, a pivoted latch bar carried by the draft device and having a flat engaging face, a pin mounted on the tractor and provided with a flat engaging face to receive the flat engaging face of the latch device, means for retaining said pin in position normally to effect engagement of said flat faces, and a foot lever secured to said pin for operating the same to release the latch device.

21. The combination with a tractor, a plate secured thereto, a plow and a draft device connecting the plow with the tractor, means for lifting the draft device and plow, a pivoted latch bar carried by the draft device and having a flat engaging face, a pin mounted on the plate on the tractor and having a flat engaging face to receive the flat engaging face of the latch bar, a foot lever secured to said pin, said foot lever provided with an arm having a stop to engage said plate, and a spring connected with said lever arm and with said plate.

22. The combination with a tractor, a plow, and a draft device connecting the plow with the tractor, of an annular series of segmental plates secured to the spokes of a wheel of the tractor, each plate having an inclined lug thereon, a movable member carried by the draft device, and lever operated means for moving said member into the path of the lugs on the tractor wheel.

23. The combination with a tractor, a plow and a draft device connecting the tractor with the plow, of an annular series of plates clamped to the spokes of one of the tractor wheels, each of said plates having a plurality of inclined lugs projecting inwardly from said plates and strengthening ribs connecting said lugs with the plates, a movable member on the draft device, and lever-operated means for moving said member into the path of the lugs on the tractor wheel.

In testimony whereof I have signed this specification in the presence of two subscribing witnesses.

EDWARD M. HEYLMAN.

Witnesses:
 EDWIN NICAR,
 KATE E. BUCKLEY.